United States Patent [19]

Fukuda et al.

[11] Patent Number: 4,461,941
[45] Date of Patent: Jul. 24, 1984

[54] MICROWAVE OVEN WITH INFRARED TEMPERATURE DETECTOR

[75] Inventors: Norisuke Fukuda, Tokyo; Susumu Miyazawa, Chigasaki, both of Japan

[73] Assignee: Tokyo Shibaura Denki Kabushiki Kaisha, Kawasaki, Japan

[21] Appl. No.: 382,284

[22] Filed: May 26, 1982

[30] Foreign Application Priority Data

Nov. 16, 1981 [JP] Japan .................. 56-182354

[51] Int. Cl.³ .............................................. H05B 6/68
[52] U.S. Cl. ...................... 219/10.55 B; 219/10.55 F; 250/351; 250/341; 350/6.5; 374/121; 374/149
[58] Field of Search .................. 219/10.55 B, 10.55 R, 219/10.55 F, 10.55 E, 492; 250/351, 347, 341, 338 R; 374/121, 124, 129, 149; 350/6.1, 6.5, 6.6

[56] References Cited

U.S. PATENT DOCUMENTS

| 4,245,143 | 1/1981 | Miura et al. | 219/10.55 B |
| 4,286,134 | 8/1981 | Nakata et al. | 219/10.55 B |
| 4,347,418 | 8/1982 | Nobug et al. | 219/10.55 B |

FOREIGN PATENT DOCUMENTS

| 54-20443 | 2/1979 | Japan | 219/10.55 B |
| 2062428 | 5/1981 | United Kingdom | 219/10.55 E |

*Primary Examiner*—Roy N. Envall, Jr.
*Assistant Examiner*—Philip H. Leung
*Attorney, Agent, or Firm*—Schwartz, Jeffery, Schwaab, Mack, Blumenthal & Koch

[57] ABSTRACT

The microwave oven includes a heat chamber, an infrared detector for detecting infrared rays irradiated from an object to be heated in the heating chamber, a chopper for alternately interrupting the path of infrared rays to the detector, an oscillator for producing a reference signal used for driving the chopper, and a circuit for regulating the output of the detector and the phase of the reference signal. The infrared detector does not require any phase adjustment to accommodate frequency shifts due to fluctuations in the power frequency.

3 Claims, 9 Drawing Figures

MICROWAVE OVEN WITH INFRARED TEMPERATURE DETECTOR

BACKGROUND OF THE INVENTION

This invention relates to a microwave oven or range. More particularly, this invention relates to a microwave oven having an infrared detector which does not require any phase adjustment to accommodate frequency variations caused by the fluctuations in the power supply frequency, which is a relatively small and thin structure, and which is capable of accurately detecting temperatures with high reliability for a long period of time.

It is important to determine the exact temperature of an object to be heated for the purpose of operating a microwave oven effectively. For this purpose, there has been proposed a microwave oven having an infrared detector for detecting the temperature of an object to be heated in a non-contacting manner. In order to detect the temperature by using a pyroelectric infrared detector, it is necessary to alternately interrupt incident infrared rays mechanically by a ray-chopper to produce an alternating signal. This requires a mechanism for alternately driving the chopper. For such alternate driving, a synchronous motor has been used because it has good rotational frequency stability and is relatively inexpensive. Thus, a mechanism has been used in which blades are mounted on the output shaft of such a synchronous motor.

However, a synchronous motor has the drawback that a low start up torque is developed in response to a stable rotational frequency since rotation is synchronous with the power frequency.

In order to remove this drawback, a synchronous motor is required to be connected to a reduction gear or such a structure that permits slippage between the rotation of the blades and the motor shaft upon start-up. However, such a motor with a slippage structure has the disadvantage that it lacks reliability for a prolonged usage. Also, the rotational frequency of a synchronous motor is different depending upon the power frequency. Since a pyroelectric infrared detector has a frequency characteristic when a microwave oven is from an area having one power frequency to an area having a different power frequency, a sensitivity compensation must be made. Further, in cases where the signals from the pyroelectric infrared detector are treated by synchronous detection, the blades of the chopper must be phased with the infrared input, namely, mechanical adjustment is required when the microwave oven is moved from one area to another where different power frequencies are used.

Finally, the aforementioned chopper-driving mechanism is structurally complicated due to unavoidable factors such as the size of the synchronous motor and others, leading to difficulty of reduction in size.

SUMMARY OF THE INVENTION

The present invention is designed to eliminate the above disadvantages. It is therefore an object of the present invention to provide a microwave oven having an infrared detector which will not be adversely affected by fluctuations in power frequency and which does not require any mechanical adjustment even at the time of adjustment operations.

Another object of the present invention is to provide a microwave oven having an infrared detector which is capable of being adjusted by a simplified electrical method and which is of a small and thin structure.

Further object of the present invention is to provide a microwave oven having an infrared detector which can carry out the exact detection of temperature of an object to be heated over a long period of time with high reliability.

Namely, a microwave oven of the present invention comprises a heat chamber, detector means for detecting infrared rays irradiated from an object to be heated in said heating chamber, chopper means for alternately interrupting the path of infrared rays to said detector means, an oscillator for producing a signal used for driving said chopper, and means for regulating the output of said detector means and the phase of said reference signal at their optimum conditions.

DETAILED DESCRIPTION OF THE PREFERRED EMBODIMENT

Figure 1:
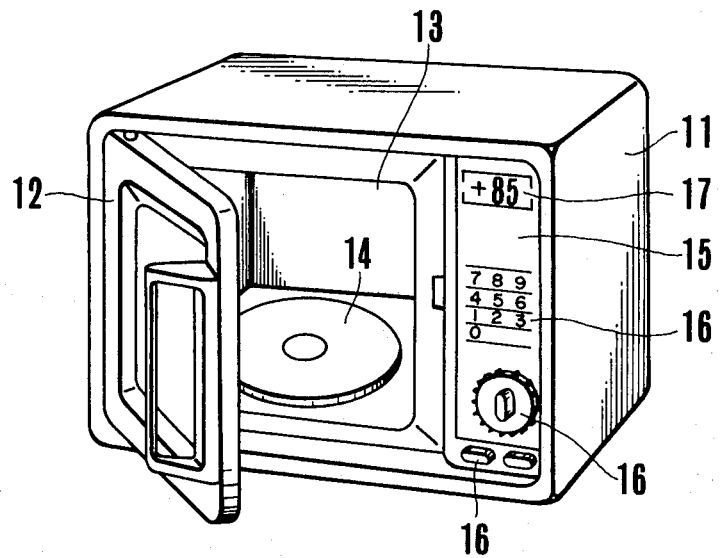
FIG. 1 is a perspective view of the outline of a prior art microwave oven.

FIG. 1 is a perspective view showing the outline of a prior art microwave oven which includes a body 11. This body 11 includes an openable door 12 mounted on the forward portion thereof to form a heating chamber 13 which is defined by the door 12 and the inner walls of the body 11. The heating chamber 13 includes a rotary table 14 located above the bottom thereof and on which an object to be heated is placed. As is well known in the art, the object to be heated in the heating chamber 13 can be subjected to irradiation of electromagnetic waves (microwave), by the energy of which molecules of water in the object are excited to heat the object. The forward face of the microwave oven body 11 has a control panel 15 located adjacent to one side. The control panel 15 includes various operation switches 16 and an indicator 17. When the above operation switches 16 are selectively actuated, heating conditions can be set such as the intensity of the energy in an electromagnetic wave, time of irradiation, and others. The indicator 17 displays the temperature of the object to be heated which has been detected by any suitable temperature detector contained in the body 11.

Figure 2:
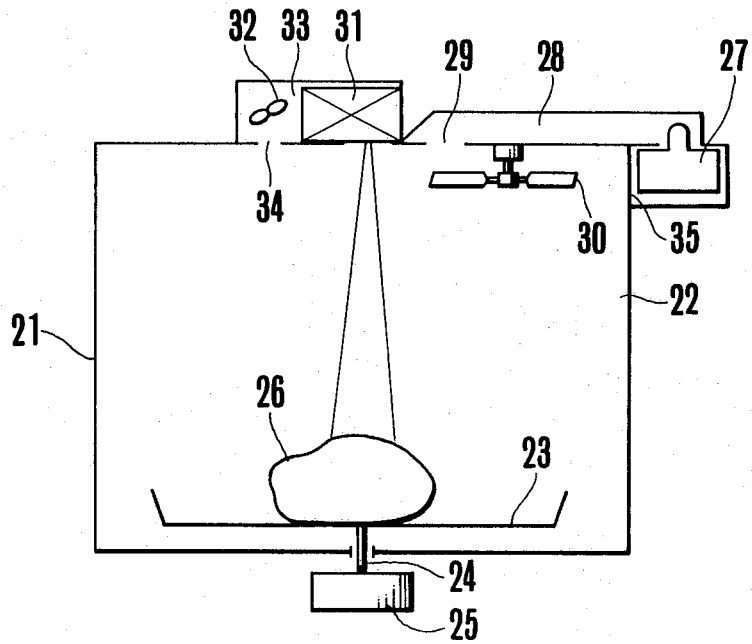
FIG. 2 is a view showing the internal structure of a microwave oven.

Such a microwave oven has an internal construction as shown in FIG. 2 in which a rotary table 23 is disposed within a heating chamber 22 of a microwave oven body 21. The rotary table 23 is operatively connected to the output shaft 24 of a motor 25 which extends through the bottom of the body 11 into the heating chamber 22. An object to be heated 26 is placed on the rotary table 23 and rotated therewith when the table 23 is rotated by the motor 25. The body 21 includes a magnetron 27 disposed in the upper section thereof which generates microwave energy. The microwave energy is introduced into the heating chamber 22 through a waveguide 28 to heat the object 26. A microwave agitating fan 30 is disposed adjacent to the opening 29 of the waveguide 28 and can be rotated by means of a flow of air to equalize the microwave energy in the heating chamber. The upper section of the body 21 also includes an infrared detector 31 for detecting infrared rays irradiated from the heated object 26. The infrared detector 31 is cooled by a flow of air which is introduced by a fan 32 through an air passage 33. This air flow is introduced into the heating chamber through an inlet of air 34 in the top wall of the heating chamber and then discharged through an outlet port 35 to atmosphere together with matters emitted from the heated object 26 such as steam and others.

Figure 3:
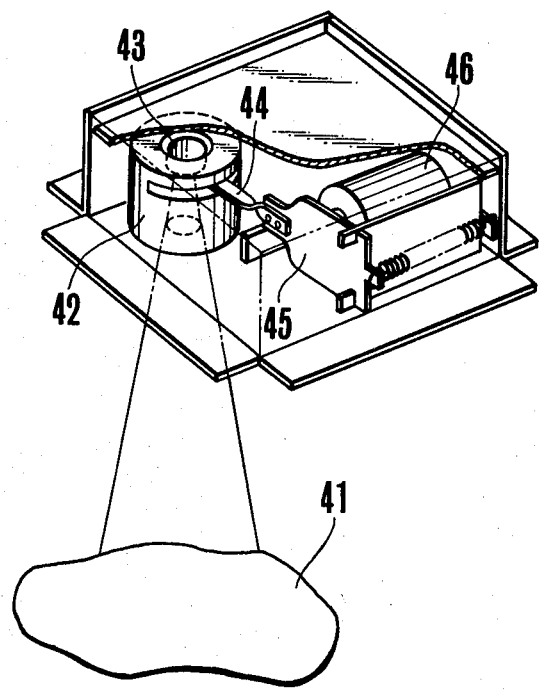
FIG. 3 is a perspective view showing the structure of an infrared detector which can suitably be used in the present invention.

The infrared detector 31 in such an arrangement may be constructed as shown in FIG. 3 in accordance with the present invention.

Referring to FIG. 3, infrared rays emitted from the surface of an object to be heated 41 are restricted by means of an optical diaphragm 42 before they impinge on a pyroelectric infrared detector 43. The path of the infrared rays to the detector is alternately interrupted by means of a chopper 44 which is disposed adjacent to the detector, a moving part 45 which is disposed adjacent to said chopper, and a solenoid-driving part 46 which consists of an iron core, a coil, a solenoid and a spring.

Figure 4:
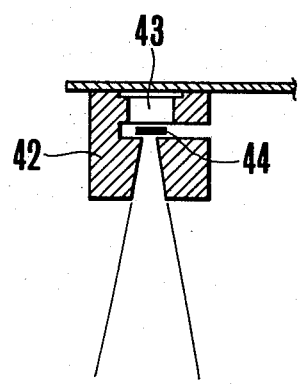
FIG. 4 is a sectional view illustrating the position of the chopper shown in FIG. 3.

FIG. 4 is a sectional view illustrating the chopper 44 at a position in which it is located in close proximity to the detector 43 at the bottom of the optical diaphragm 42 having a frusto-conical opening. Thus, the chopper is positioned at such an area that the infrared rays to be incident on the detector are most restricted, resulting in improvement of function.

In the present invention, it is preferred that said chopper is in a position to interrupt infrared rays when it stops.

Figure 5:
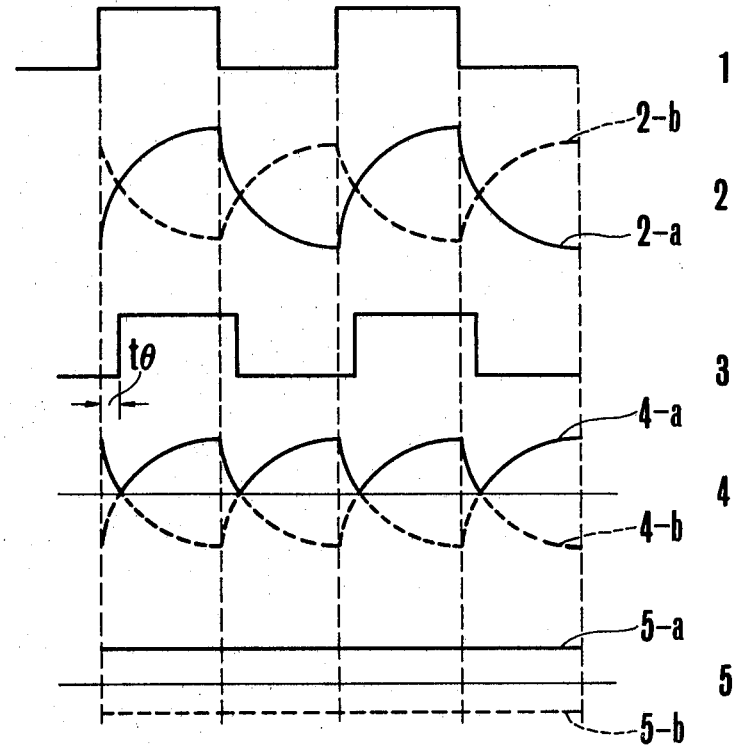
FIG. 5 is a timing chart showing between the infrared input and the output of the detector.

FIG. 5 illustrates the relationship between a reference signal and the output of the detector. The infrared rays from an object to be heated are chopped and are inputted to the infrared detector in the form of a rectangular wave as shown by signal 1. Due to the detector time constant, the detector generates an output signal having a waveform as shown by signal 2 in response to the inputted rectangular signal 1. If the chopper blade has a temperature higher than that of the object to be heated, the output signal of the detector would have a waveform as shown by signal 2a. If the temperature of the object to be heated is higher than that of the chopper blade, the output signal would be a waveform as shown by signal 2b. In order to obtain a signal synchronized with the infrared detector output, therefore, the it is desired that above signal 2 be inverted midway between its peaks to produce a resultant signal 4. Preferably a synchronous detector is used to perform this inversion as will be discussed hereinafter. However, because the mid point of signal 2 is delayed in time from its initial point, there is a phase delay t between signal 4 and signal 1. Consequently, the signal used to drive a synchronous detector for inverting signal 2 must also have a phase delay $t_\theta$. Such a driving signal must have a waveform as shown by signal 3. Thus, by the use of signal 3, an optimum phase relation between the reference signal, which is the infrared input, and the output of the detector can be maintained. Although signal 4 is obtained by processing the signal 2 under synchronous detection in the manner described above, it is preferable that the actual temperature indicative signal be a direct current signal. Thus, the signal is smoothed to produce direct current signal 5.

Figure 6:
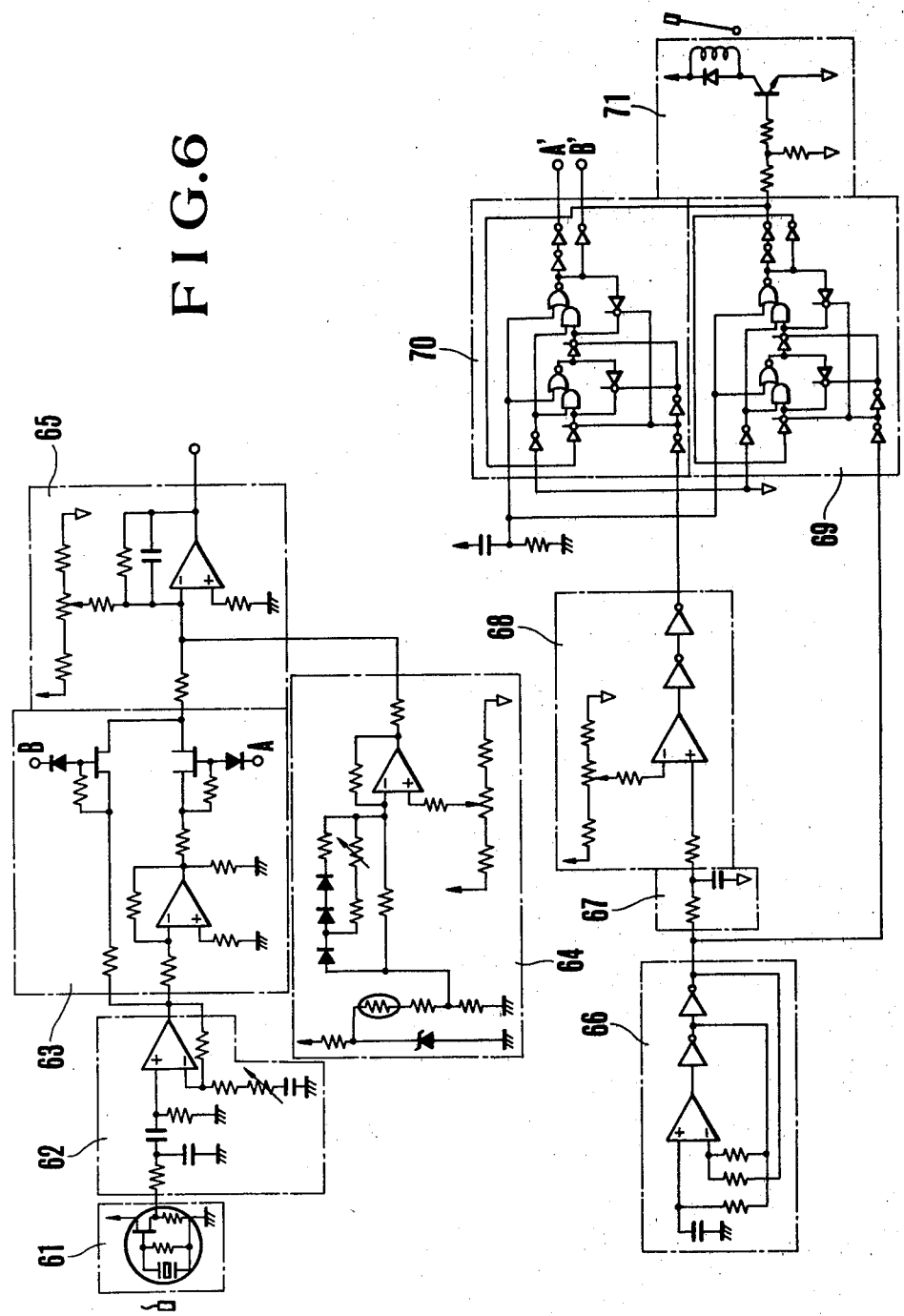
FIG. 6 is a circuit diagram of an infrared detector.
Figure 7:
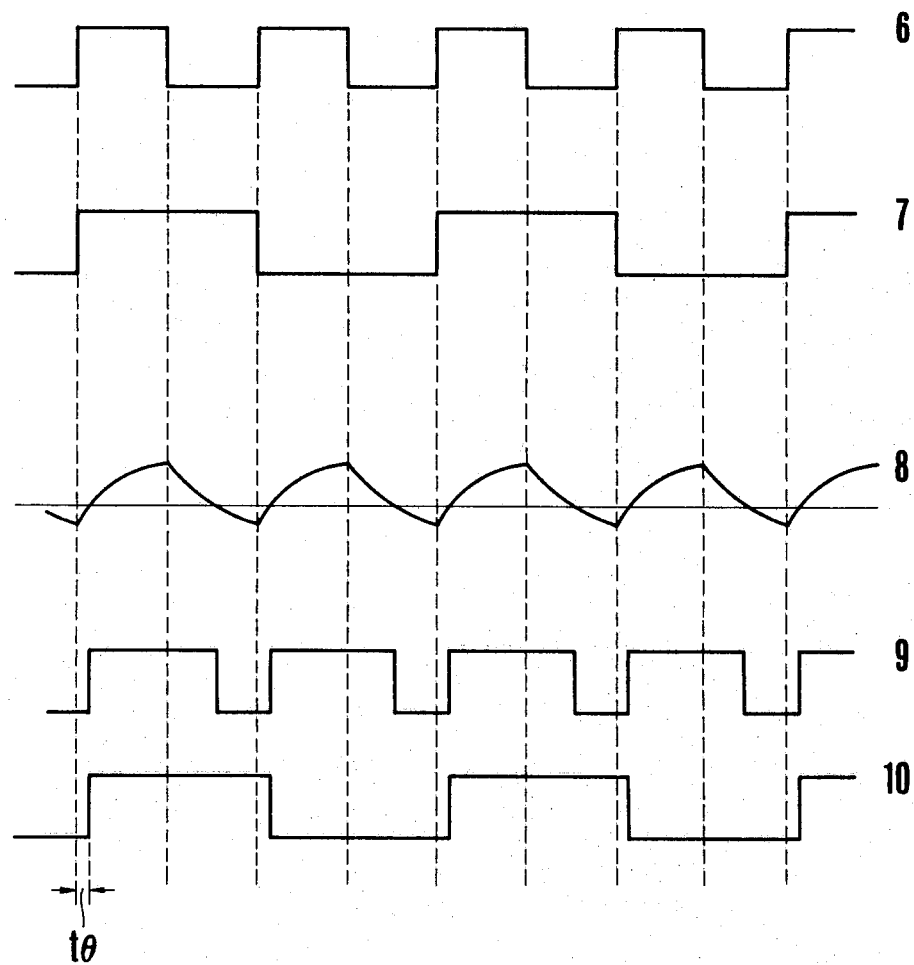
FIG. 7 is a timing chart demonstrating operation of a solenoid chopper according to the present invention.

FIG. 6 shows an example of a signal processing circuit according to the present invention, which will not be described in detail. A signal is supplied from a pyroelectric infrared detector 61 to a filter and AC amplifier 62, a synchronous detector 63. A chopper blade temperature detecting circuit 64 produces a signal indicative of chopper blade temperature. A temperature signal output circuit 65 adds and smooths the signals from detector 61 and detecting circuit 64. An oscillator 66 is coupled to an integrator 67, and a D-type a flip flop circuit 69. The output of integrator 67 is connected to a comparator 68 and the flip flop circuit 69 output is connected to actuate a solenoid 71. Reference numeral 70 denotes a flip flop circuit which receives the comparator 68 output and which produces signals which cause the synchronous detector to switch. The above relationship between the components will be described with reference to FIG. 7. The output signal 6 of the oscillator 66 is converted into a waveform as shown by signal 7 by means of the D-type flip flop circuit 69 and then used to drive the solenoid chopper 71. In the illustrated position, the infrared input is alternately interrupted. The output of the oscillator 66 also is supplied to the integrator 67 wherein it is converted into a waveform as shown by signal 8. By varying the comparison voltage in the comparator, there is obtained a signal 9 which is out of timing relative to the output waveform 6. This signal 9 is supplied to the D-type flip flop circuit 70 wherein it is binary divided down to form a synchronized signal 10. This signal 10 is out of phase by $t_\theta$ with the solenoid driving signal 7. This means that the phase delay to has been electrically adjusted to produce an optimum driving signal for synchronous detector 63. It will be noted that signal 7 corresponds to signal 1 of FIG. 5 and that signal 10 corresponds to signal 3 of FIG. 5. Accordingly, it can be seen that synchronous detector 63 can produce a properly inverted signal as explained with reference to FIG. 5.

The optimum phase angle $t_\theta$ of the output of the synchronous detector 63 and the reference signal of the oscillator 66 will now be discussed. In cases where the infrared detector 61 is driven, for example, at a frequency of f Hz using a detector 61 of the pyroelectric type having a thermal time constant $\tau_T$ and an electric time constant $\tau_E$, the output voltage (i.e., unit step response) to a unit step input can be calculated from the following equation:

$$V(t) = \frac{\epsilon AR}{G} \cdot \frac{aP_S}{aT} \cdot \frac{1}{1/\tau_E - 1/\tau_T} \left\{ \exp\left(-\frac{t}{\tau_T}\right) - \exp\left(-\frac{t}{\tau_E}\right) \right\}$$

Figure 8:
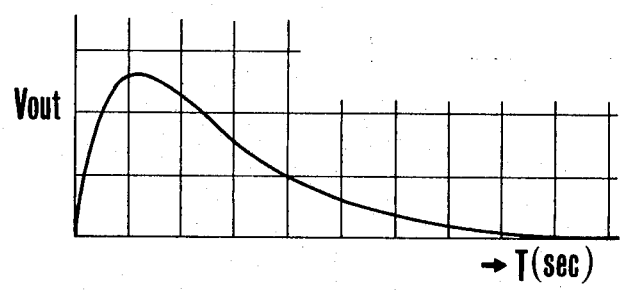
FIG. 8 is a graph relation showing the output voltage of a pyroelectric sensor in response to a unit step input.

Upon calculation of $$V'(t) = \exp\left(-\frac{t}{\tau_T}\right) - \exp\left(-\frac{t}{\tau_E}\right)$$

assuming that $\tau_T$ and $\tau_E$ are 0.25 and 0.1, respectively the waveform of FIG. 8 is obtained.

Figure 9:
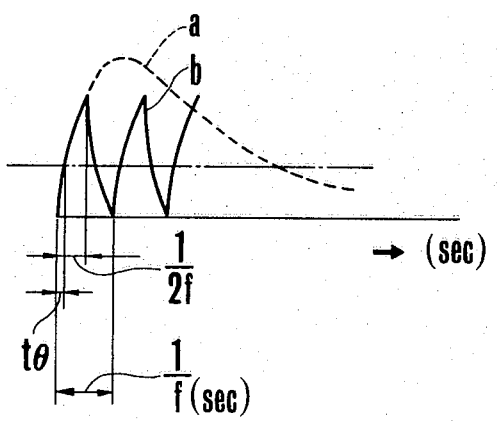
FIG. 9 is a modification of FIG. 8, in which the incident rays in FIG. 8 have been chopped periodically.

If the incident rays are chopped periodically, the waveform of FIG. 9 is obtained. In FIG. 9, "a" shows the unit step response and "b" the response resulting from repeated incidences of the infrared radiation on the detector 61 due to the chopping effect.

The optimum delay angle at $t_r$ may be obtained by obtaining the center of the peak from a half value of $V'(t)$ at $1/2f$ (sec), the obtaining $t_\theta$ from the so obtained center of peak and assuming that $1/2f$ is $\pi/2$.

Upon calculation, it is about 27°, and upon experiment, it is 36°.

Difference between these values is considered to have been caused by an measurement error or $\tau_E$ and $\tau_T$. Accordingly, the values obtained actually by experiments have been adopted here.

It will be apparent from the foregoing explanation that the microwave oven according to the present invention does not require any mechanical adjustment in cases when the oven is used after being moved to an area where a different power frequency is employed. Further, it does not cause problems such as locking phenomenon and back rotation due to smaller torque of the motor, because the infrared detector is driven by a solenoid. In addition, the oven of the present invention has an advantages in that it requires no device for detecting the rotation of the chopper blade and that it is possible to make its structure to be of simplified small and thin structure.

We claim:

1. A microwave oven comprising:
   a heat chamber;
   means for heating an object in said heat chamber;
   detector means for detecting infrared rays irradiated from an object in said heat chamber, said detector means including an infrared sensor producing a sensor output;
   a chopper for alternately interrupting the path of said infrared rays to said detector means in response to an alternating signal;
   an oscillator for producing said alternating signal to drive said chopper at a predetermined period; and
   means for producing a signal which has the same period as said alternating signal for driving said chopper and has a timing delay relative to said alternating signal and for synchronously detecting said sensor output of said infrared sensor in response to said delayed signal.

2. A microwave oven according to claim 1 wherein said detector means includes means in front of said infrared sensor for progressively increasingly restricting the path of said infrared rays from said object, and wherein said chopper is positioned to interrupt said path at the most restricted area.

3. A microwave oven according to claim 1 or 2 wherein said chopper comprises a solenoid chopper.

* * * * *